(No Model.) 5 Sheets—Sheet 3.

T. FOWLER & T. B. DE FOREST.
BOX NAILING MACHINE.

No. 361,754. Patented Apr. 26, 1887.

Witnesses
J S Williamson
E. F. Meeker

Inventors
Thaddeus Fowler
Thomas B. DeForest
by Smith and Hubbard
attorneys

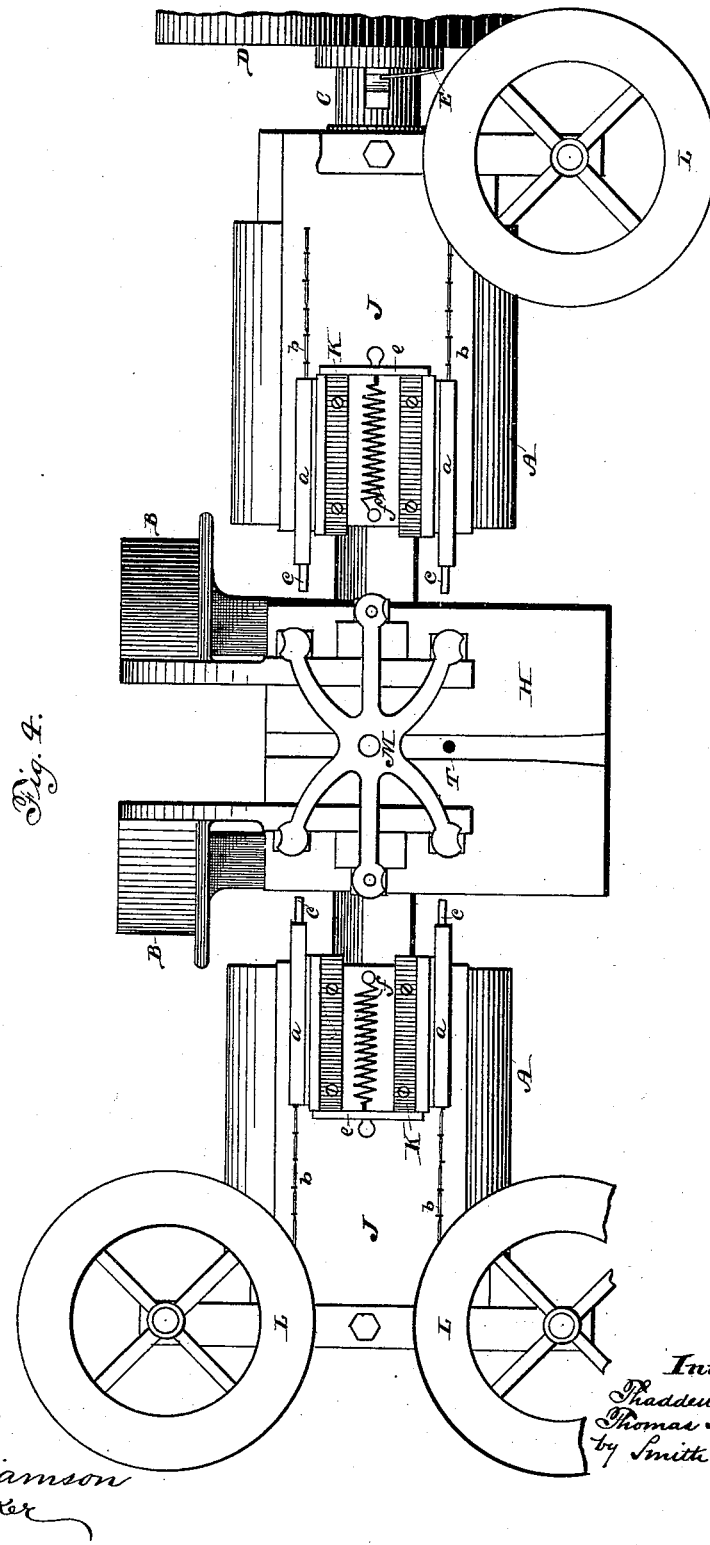

(No Model.) 5 Sheets—Sheet 5.
T. FOWLER & T. B. DE FOREST.
BOX NAILING MACHINE.
No. 361,754. Patented Apr. 26, 1887.
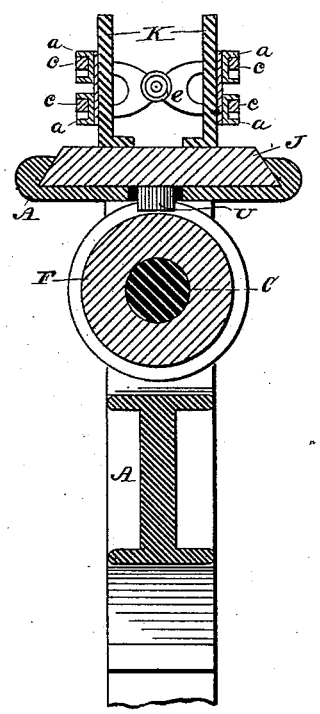
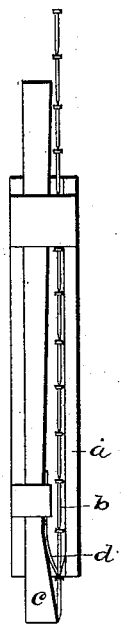
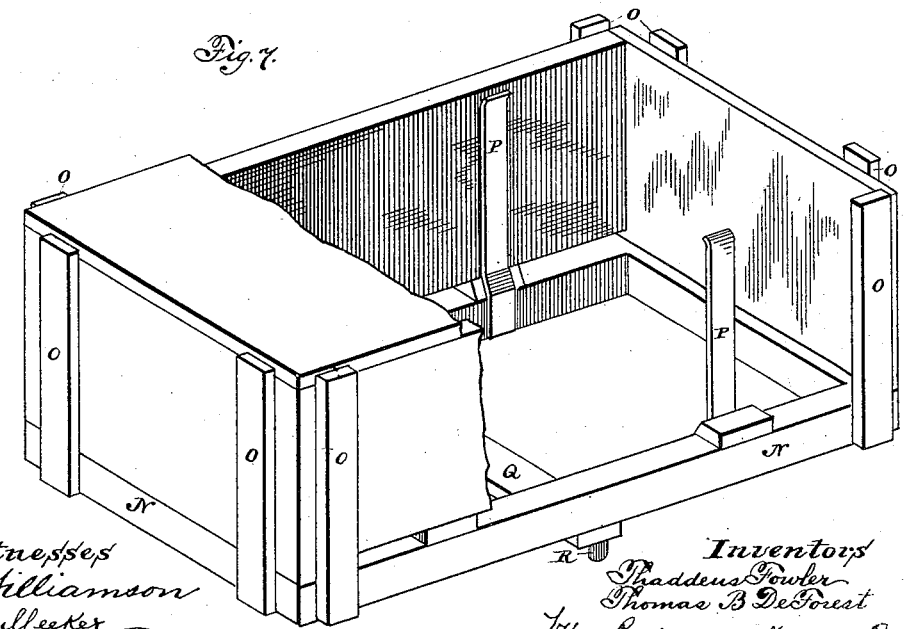
Witnesses
S. S. Williamson
E. F. Meeker
Inventors
Thaddeus Fowler
Thomas B De Forest
by Smith and Hubbard
attorneys

United States Patent Office.

THADDEUS FOWLER, OF SHELTON, AND THOMAS B. DE FOREST, OF BIRMINGHAM, CONNECTICUT.

BOX-NAILING MACHINE.

SPECIFICATION forming part of Letters Patent No. 361,754, dated April 26, 1887.

Application filed December 11, 1886. Serial No. 221,296. (No model.)

*To all whom it may concern:*

Be it known that we, THADDEUS FOWLER and THOMAS B. DE FOREST, citizens of the United States, and resident the former at Shelton, in the county of Fairfield, and the latter at Birmingham, county of New Haven, and State of Connecticut, have invented certain new and useful Improvements in Box-Nailing Machines; and we do hereby declare the following to be a full, clear, and exact description of the invention, such as will enable others skilled in the art to which it appertains to make and use the same.

Our invention relates to certain new and useful improvements in machines for nailing together the several shooks which form the bottom and sides of a box, and has for its object to provide a machine which shall be automatic in its action, strong and simple in construction, and whereby, if desired, all the nails necessary to hold the sides of a box to each other and to the bottom may be driven at a single operation; and with these ends in view our invention consists in the details of construction hereinafter set forth, and then recited in the claims.

In order that those skilled in the art to which our invention appertains may fully understand how to make and use our improvement, we will describe the same in detail, referring by letter to the accompanying drawings, which form a part of this specification, and in which—

Figure 1:
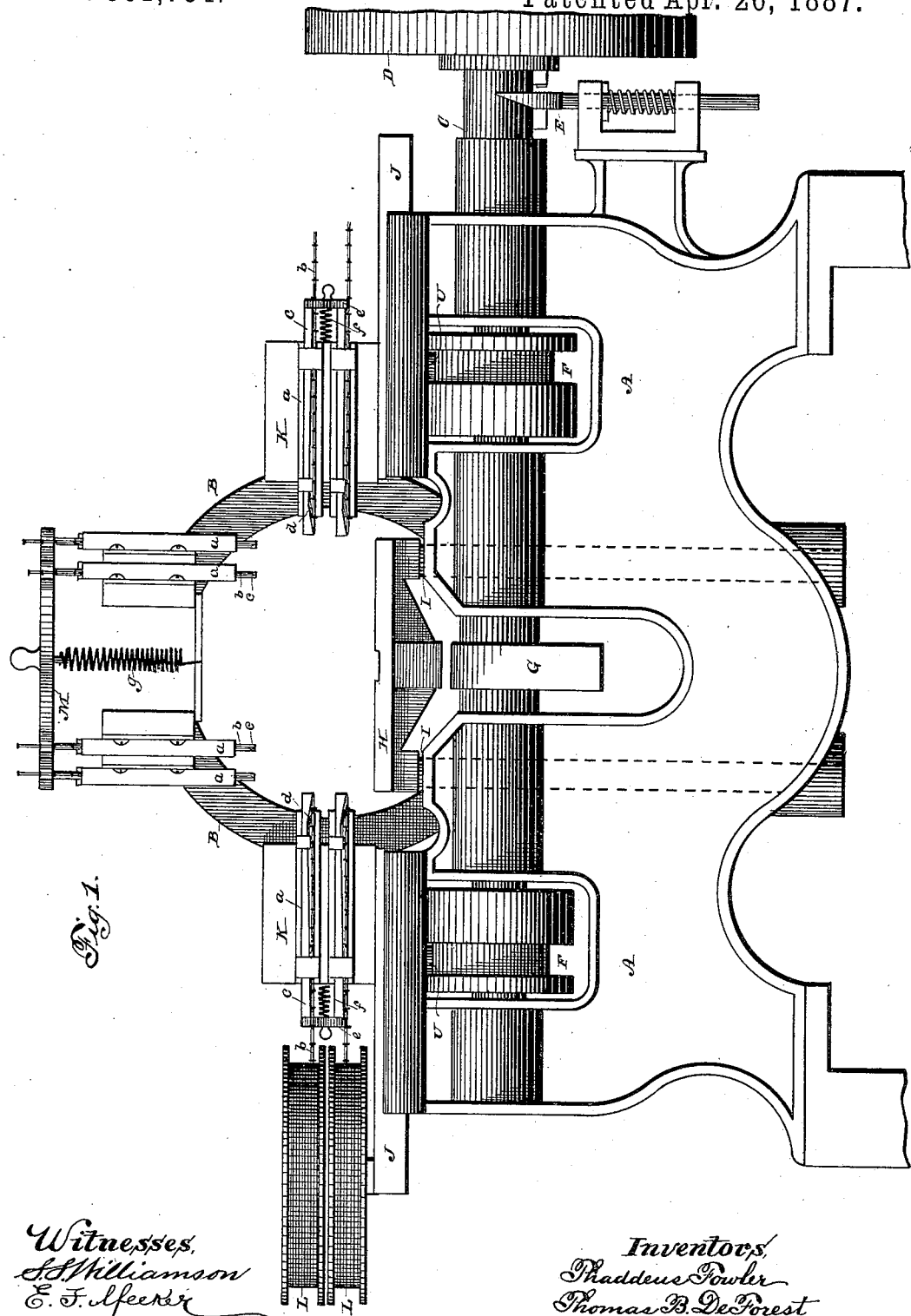
Figure 2:
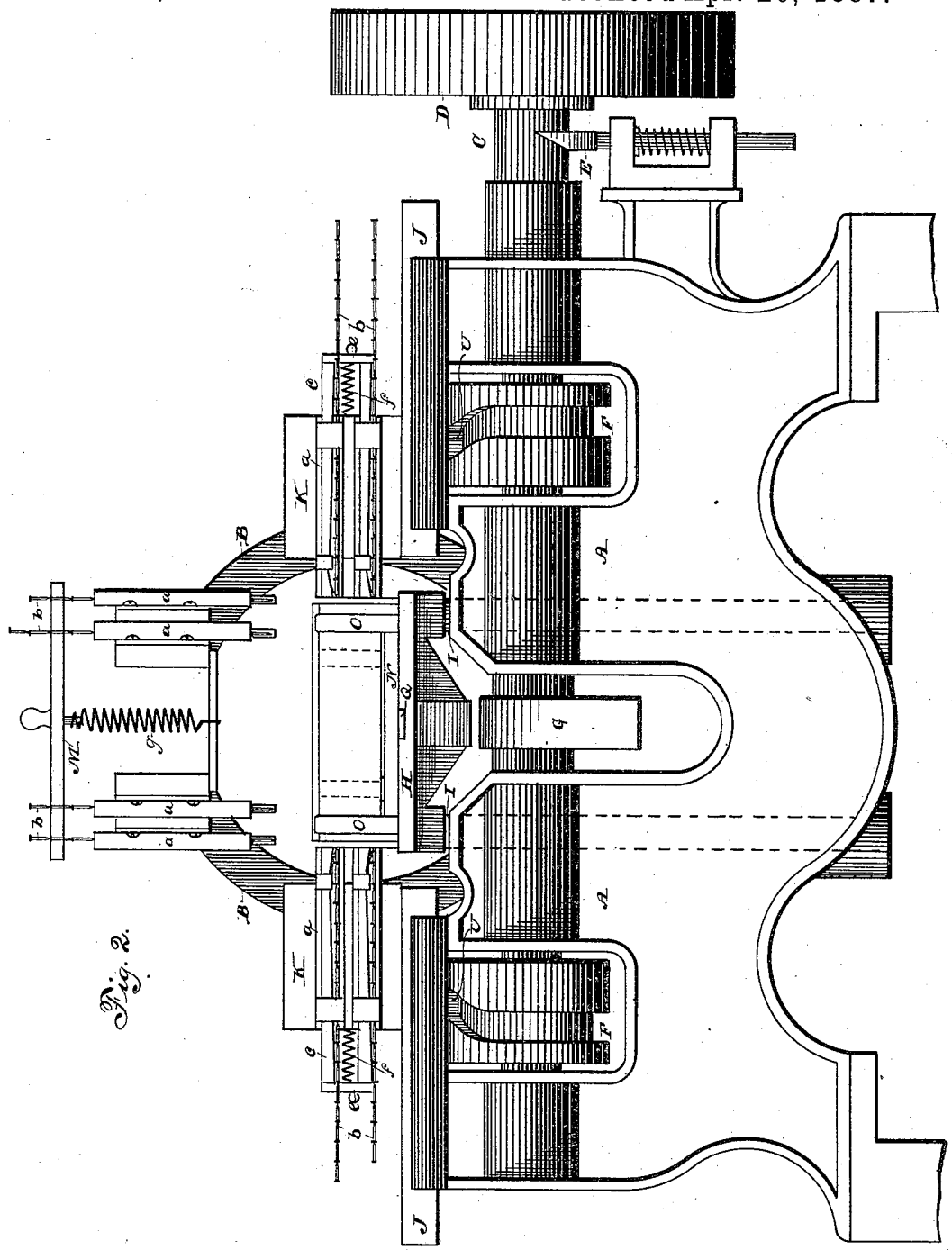
Figure 3:
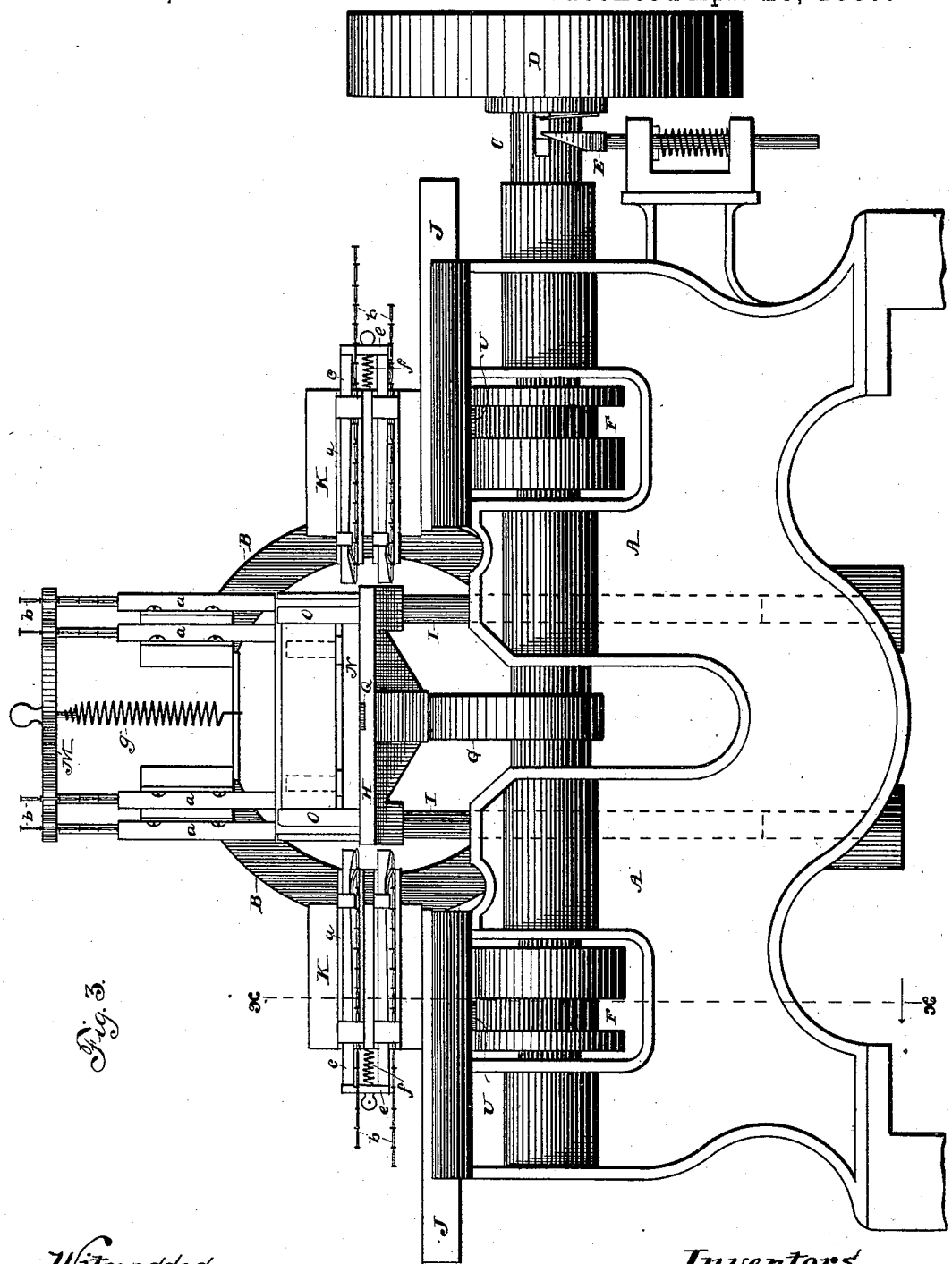

Figure 1 is a front elevation showing the endwise drivers withdrawn and the platen down; Fig. 2, a similar view after the end drivers have advanced and driven the end nails; Fig. 3, a similar view showing the end drivers withdrawn and the platen raised for the proper presentation of the box to the upper drivers; Fig. 4, a plan view of the machine; Fig. 5, a transverse vertical section at the line *x x* of Fig. 3; Fig. 6, a detail of one of the drivers; and Fig. 7, a perspective of the former, showing a set of shooks arranged therein for proper presentation to the drivers, said shooks being partially broken away.

Similar letters denote like parts in all the figures of the drawings.

A is a cast-iron frame, upon which the operative parts of our machine are mounted.

B are upward projections from the frame for the support of the top drivers.

C is the main shaft, journaled in a thickened portion of the frame longitudinal of the machine.

D is the driving-pulley, and E is a stop-motion mechanism arranged between the pulley and shaft after the manner of ordinary drawing or stamping presses.

F are grooved cams secured on the main shaft, and G is a toe-cam, whose function is to raise the platen, as will hereinafter more fully appear.

H is the platen. It is arranged upon the tops of rods I, which are free to slide vertically in the frame. The toe-cam above referred to engages at each revolution with the bottom of the platen, thereby raising it and its rods.

J are carriages mounted and adapted to slide in ways formed in the frame at either end thereof, and backward and forward movement is given to them by the engagement with the cams F of pins U, which project downward from each carriage, as seen in the several elevations and in the section.

Mounted upon standards K, which project upward from each of the carriages above referred to, are arranged the drivers for delivering and severing the nails which secure the sides and ends of the box together. Four nails serve for each end of a cigar-box, and we have shown four drivers upon each carriage; but of course for boxes of larger size a greater number would necessarily be required. Each of these individual drivers consists of a trough-shaped guideway, *a*, through which a continuous length of nails, lettered *b*, is led from the reels L. A cut-off bar, *c*, whose forward extremity is inclined backward, as seen at Fig. 6, lies in the groove alongside the nails, and a feeding-spring, *d*, (see Fig. 6,) is secured to and moves with the bar *c*. The rear ends of the several cut-off bars are connected by a frame, *e*, and a spring, *f*, secured between the frame *e* and the standard K, tends to keep the cut-off bars projected out of the guideways, as seen at Fig. 1. The limit of this forward movement may be determined by any usual stop.

Supported from the upward projections, B, above the frame, is a gang or collection of drivers similar in construction to those just described, and having the tops of their cut-off bars secured to frame M, which is connected by spring *g* with a bar between the projections B, for the purpose of keeping the cut-off bars projected without the guideways. These top drivers are provided in sufficient numbers to supply the necessary nails for securing the bottom of the box to the sides. Six nails are usual in cigar-boxes for this purpose, and we have shown a gang of six drivers in the drawings. Reels similar in all respects to those upon the ends of the machine provide the nails for the top drivers; but as these reels present no novel feature and form no part of our invention, except as they are combined with the drivers, we have not thought it necessary to show them in the drawings. Excepting in Figs. 1 and 4, also, we have not deemed it necessary to show the end reels, but have merely broken off the lengths of nails.

In Fig. 7 we have shown the former, which consists of the rectangular frame N, having the upwardly-projecting posts O, which hold the shooks from without, and the springs P, which press the shooks outward against the posts. A guide-strip, Q, is secured across the bottom of the frame, and the platen is grooved on its upper surface, so that, the former being placed upon the platen, the engagement of the guide-strip with the groove determines its proper position in one direction, and the engagement of pin R on the guide-strip with a hole, T, in the platen determines it in the other, thereby assuring the proper location of the box relative to the drivers. When in the frame ready for the action of the machine, the shook which is to form the bottom of the box lies upon the top of the side and end shooks, as is partially shown in Fig. 7.

The action of the drivers which we have shown is as follows: The end nail of each string projects beyond the forward end of the guideway, and its head is engaged thereby. When the carriages and drivers move up against the box, the end nail of each string, whose head is engaged by the extremity of its trough-shaped guideway, is pushed into the wood of the box, and simultaneously, by its contact with the box, the spring-actuated cut-off bar is pushed backward into the said guideway. Just before the nail is driven completely home the cut-off bar has been forced into the guideway far enough, so that its wide end, which about fills the guideway, (see detail, Fig. 6,) severs the nail by crowding it against the driving end of the guideway. The inward motion of the cut-off bar carries back the feed-spring far enough to engage the head of the nail next above, which it draws down into engagement with the end of the guideway upon the return movement of the bar before the cutting off is complete, the nails having been partially driven. The exact distance of their entrance prior to severing may be varied by varying the shape or length of the cut-off bar.

A more full and detailed description of drivers of this class may be found in the Patent No. 345,679, granted to us the 20th day of July, 1886, and in the allowed application of Thaddeus Fowler, Serial No. 214,421, filed September 24, 1886.

The operation of our invention is as follows: The shooks are first placed in position in the former, which is placed in position, as before explained. Then, the shaft and pulley having been connected by the stop-motion mechanism, the shaft revolves, and the carriages, by means of the grooved cams, are moved forward, so that the drivers are forced into contact with the end shooks within the former, as shown at Fig. 2, whereby the four nails necessary to secure each end of the box are simultaneously driven and cut off. Further revolution of the shaft withdraws the carriages, and the springs cause fresh nails to be fed outward as the cut-off bars are returned out of the guideways. As the end drivers recede out of contact with the box, the toe-cam in its revolution raises the platen and box against the upper drivers, which drive in the nails necessary to secure the bottom to the sides in the same manner which has been described with reference to the endwise drivers. The cam, passing under, then allows the platen to drop back to its normal position, and the machine stops. The former is then removed, and a new one filled with shooks may be placed in position for the next operation.

In this our invention we do not wish to be confined to the precise details of construction which we have herein shown and described, since we can substitute for the driving devices herein specified others equally simple and adapted to carry string-nails—as, for instance, such a driver as is shown and described in Letters Patent No. 345,679. We can furthermore vary the number or position of the drivers to accommodate varied constructions or shape of boxes, or in very large work the box may be subjected to two operations in order to place all the nails required for security.

The feed of our machine is certain, positive, and automatic, without regard to the direction in which the drivers operate. The raising of the box against the upper drivers may be readily changed and the said drivers caused to descend upon the box. As this change is obvious and is merely a reversal of the movement of the upper drivers and the work-supporting platen, we have not thought it necessary to show it in connection with this application.

Having thus described our invention, we claim—

1. In a box-nailing machine adapted to feed and to drive continuous or string nails, the combination, with the trough-shaped guideway, through which the length of nails is led, and by means of the end whereof the end nail of said string is driven, of a cut-off bar arranged within said trough, said bar being formed broadest at its forward extremity and normally spring-actuated without the guideway, and being adapted at its backward movement into said guideway to cut off the said end nail against the end thereof, substantially as set forth.

2. In a box-nailing machine, as described, the combination, with the main shaft extending longitudinally thereof, of a pair of grooved cams secured upon and carried by said main shaft, a pair of carriages arranged to slide in ways at either end of the frame, and having arranged thereon drivers, as described, and downward projections from said carriages engaging the said grooved cams, whereby, through the rotation of the shaft, said carriages and drivers are caused to advance and recede toward and away from each other, substantially as set forth.

3. The combination, in a box-nailing machine, with the main shaft, of a platen for the proper support of the work, a set of drivers arranged above the platen, and a cam on said main shaft adapted to engage and raise the platen and work upward toward the drivers, substantially as and for the purpose set forth.

4. The combination, with the main shaft and the cams secured thereon, of the longitudinally-movable carriages and the driving devices, as described, mounted thereon and carried thereby, the set of top drivers mounted above the machine, and the vertically-movable platen, and means for raising the same upward toward the top drivers, substantially as and for the purpose specified.

5. In a box-nailing machine adapted to drive and feed string-nails, the combination, with the vertically-movable platen and the longitudinally-movable driver-carriages arranged upon either side thereof, of the former for the support of the assembled shooks, the same having posts on its outside edges, and the springs adapted to press the shooks against the posts, and the means, as described, for insuring its proper position upon the platen relative to the driving devices, substantially as shown and set forth.

6. The combination, with the driving devices and the platen grooved upon its upper surface, of the former having inside and outside supports for the shooks, a guide-strip arranged to fit the groove in the platen, and a pin arranged to engage a hole in said platen, whereby the position of the box upon the platen may be accurately determined relative to the drivers, substantially as described.

In testimony whereof we affix our signatures in presence of two witnesses.

THADDEUS FOWLER.
THOS. B. DE FOREST.

Witnesses:
S. H. HUBBARD,
HENRY S. DE FOREST.